United States Patent [19]

Dudley et al.

[11] 3,761,834

[45] Sept. 25, 1973

[54] COMPOSITE WAVE AMPLIFIER

[75] Inventors: Kenneth W. Dudley, Sudbury; George H. MacMaster, Waltham; Lawrence J. Nichols, Burlington, all of Mass.

[73] Assignee: Raytheon Company, Lexington, Mass.

[22] Filed: Oct. 20, 1971

[21] Appl. No.: 190,840

[52] U.S. Cl. .................... 330/61 A, 330/53, 330/56
[51] Int. Cl. ............................................ H03f 15/00
[58] Field of Search ............................ 330/61 A, 56

[56] References Cited

UNITED STATES PATENTS

| | | | |
|---|---|---|---|
| 3,187,266 | 6/1965 | Marshall, Jr. | 330/61 A X |
| 3,255,421 | 6/1966 | Skaiski | 330/61 A X |
| 3,320,550 | 5/1967 | Gerlach | 330/61 A X |
| 3,491,310 | 1/1970 | Hines | 331/96 |

*Primary Examiner*—Nathan Kaufman
*Attorney*—Harold A. Murphy et al.

[57] ABSTRACT

A solid state composite wave amplifier is disclosed, having a corporate fed TEM mode linear RF structure with numerous transmission lines in parallel. Negative resistance devices such as the IMPATT type diode are mounted between each transmission line to provide a plus and minus mode configuration of the RF energy with the in-phase energy being transmitted axially along the lines. Cylindrical inner and outer resistor structures selectively absorb the radiated out-of-phase energy and assure the desired propagation mode orientation. A compact hybrid structure is provided for combining large numbers of negative resistance devices with equal RF voltage, power and impedance characteristics. Input and output transitions, such as balun transformers are utilized for the two-port transmission amplifier. A single-port reflection type amplifier also incorporated the invention.

6 Claims, 22 Drawing Figures

Patented Sept. 25, 1973 3,761,834

4 Sheets-Sheet 1

COMPOSITE WAVE AMPLIFIER

BACKGROUND OF THE INVENTION

The invention relates to the field of solid state amplifiers and, more particularly, to a composite wave device for amplifying microwave frequencies.

The generation of high frequency electromagnetic energy utilizing reverse-biased semiconductor devices was first demonstrated by W. T. Read around 1958. Since that date, negative resistance devices utilizing avalanche transit time technology have become an important solid state source of such energy. The term "avalanche" has been utilized in the art to collectively define such sources as IMPATT diodes and LSA Mode devices while the term "bulk effect" defines Gunn-type semiconductor devices.

Such sources are capable of generating several watts of power when operated at CW over relatively narrow bandwidths. Electron transit time and bunching of the charge carriers through surrounding high Q resonant cavities in vacuum-type sources have produced stable oscillations at these low power levels. In the evolution of the art relating to the generation and amplification of electromagnetic energy from vacuum tubes to solid state technology, the peak and average power capabilities in either pulsed or continuous wave operation has always been a limiting factor in acceptance of solid state devices. Requirements for present day radar and communication systems, particularly, dictate the need for higher power levels.

In individual semiconductor devices the high electric fields and avalanche currents create a thermal energy dissipation problem due to the high current densities and losses which limit the overall power generation capabilities. Experimenters in the field, however, have reported generation of several hundred watts of power at fixed frequencies upwards of 10 Gigahertz with such materials as gallium arsenide. Efficiencies as high as 60 percent have also been reported using pulsed Gunn oscillators. An article of interest relating to gallium arsenide IMPATT diodes for the generation of electromagnetic energy at microwave frequencies may be found in The Microwave Journal, July 1969, pages 71–75. The coupling of large numbers of the applicable semiconductor device sources utilizing avalanche transit time technology can now substantially approximate the power capabilities of vacuum-type devices in arrays with sufficient high power gain factors combined into an integral device.

In combining large numbers of negative resistance devices to yield the required high power levels there are two approaches which may be taken, namely, the parallel or cascade approach. The parallel approach divides the input power into a large number of portions with each portion being in turn amplified by a solid state element and the individual contributions are totaled to form an output. The major problem resides in the proper isolating of the negative resistance devices to prevent unstable oscillations in spurious modes with considerable undesirable signals being generated.

The prior art method of paralleling negative resistance devices incorporates the use of power-splitting means such as directional couplers or magic tee circuits. Impedance mismatches can result in view of the large number of components required for the circuits in order to attenuate any undesired modes of operation. An excellent example of a prior art configuration will be noted by referring now to FIG. 12 of the drawings. In this embodiment eight negative resistance diodes 10 designated by the crosses (x) are provided in a two-port device having an input branch 12 and an output branch 14. A total of ten four-port hybrid structures 16–25, inclusive, are required to provide the power splits necessary to render the circuit less sensitive to impedance mismatches in accordance with well known principles applicable to such circuits. Six resistors 26–31, inclusive, are associated with each hybrid to thereby damp out the undesired modes and assure stable operation. When the number of negative resistance devices becomes larger, for example, 20 diodes, to achieve higher power levels, a rather complicated overall hybrid combining circuit would then be involved in paralleling the negative resistance devices.

Cascading such devices has also not met with any measurable success in view of the fact that the output of each device goes to the next and there are power limitations due to thermal factors. Generally the inner connections between large numbers of amplifying elements requires the use of ferrimagnetic circulators for adequate isolation in coupling the respective amplifier stages. A phase-locking problem is also inherent in cascade arrays which limits the overall gain and power output.

A need arises, therefore, for new and novel structures for combining large numbers of negative resistance devices to yield satisfactory output power levels with the applicable devices being arranged in a parallel array and propagation in a single predetermined stable operating mode.

SUMMARY OF THE INVENTION

In accordance with the teachings of the invention, a solid state nonresonant amplifier device having relatively high gain is provided by a composite wave structure having a corporate feed, linear, RF structure with a plurality of transmission lines in parallel. Negative resistance devices are positioned between each transmission line. Any number of such devices can be employed with this parallel approach involved and the gain of each individual device is added in the output. Cylindrical resistive loading structures surround the outside and inside of the RF parallel transmission lines to selectively load the propagating modes. A compact, stable, hybrid circuit combines the negative resistance devices with equal RF voltage power and impedances. A two-port amplifier is provided in one embodiment with the transition from the coaxial line to the amplifier being provided by a tapered broadband balun transformer arrangement. Alternatively, a single-port reflection type amplifier may be supplied.

All the negative resistance devices are oriented to propagate in the ± mode. This propagation mode isolates the negative resistance devices. The out-of-phase components of the ± wave radiate and are damped by the resistive loading. The in-phase components propagate down the linear RF structure and are coupled out through the output line. Any number of the composite-wave modules may be arranged in parallel and cascade arrays to achieve sizeable output power levels.

BRIEF DESCRIPTION OF THE DRAWINGS

The invention, as well as the details for the provision of an illustrative embodiment, will be readily understood after consideration of the following detailed specification and reference to the accompanying drawings, wherein.

DESCRIPTION OF THE PREFERRED EMBODIMENT

Figures 1, 2, 3, 4:
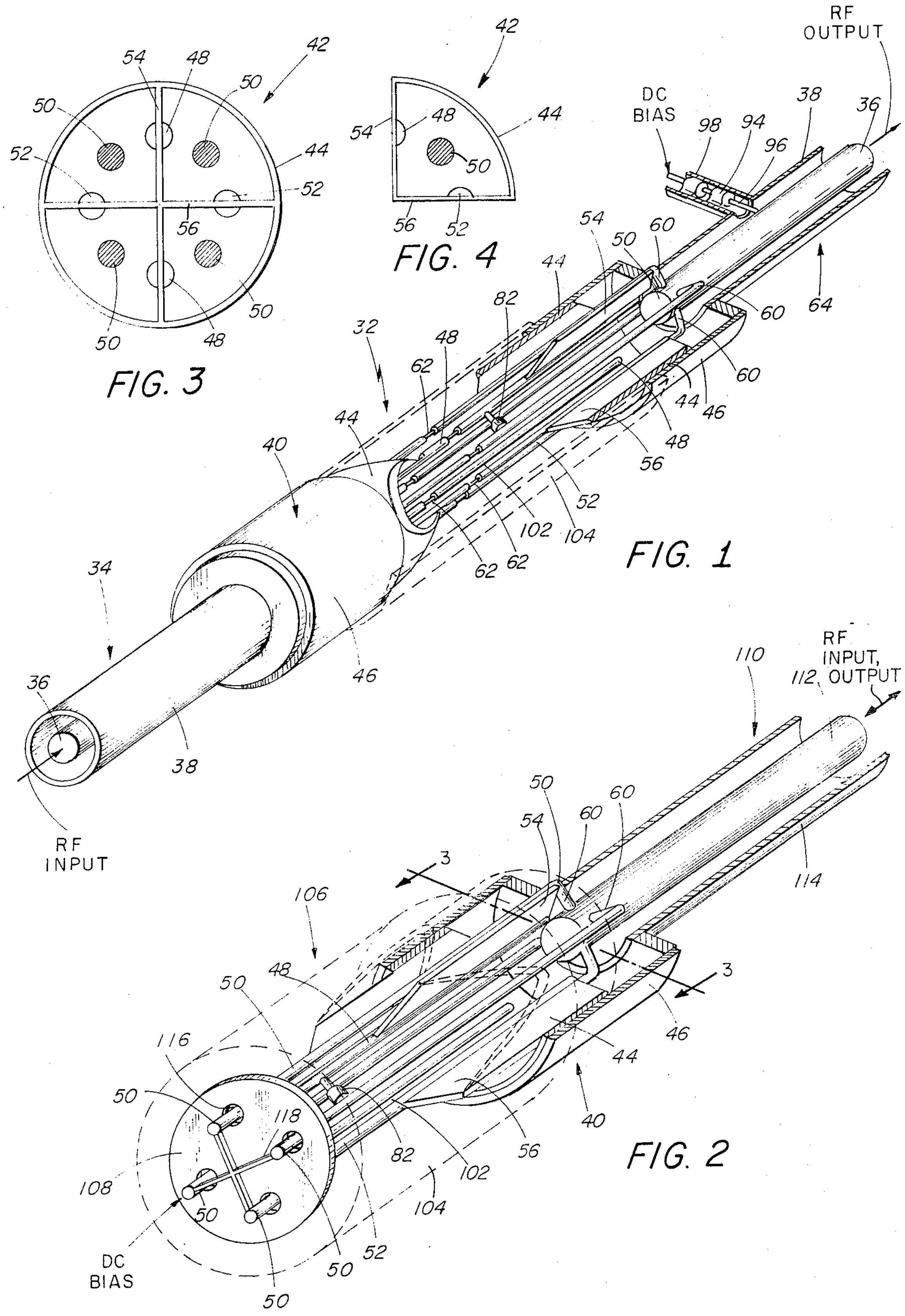
FIG. 1 is an isometric view of the two-port transmission type embodiment of the invention with a portion of the outer wall broken away to reveal internal structure.
FIG. 2 is an isometric view of a one-port reflection type embodiment of the invention.
FIG. 3 is a cross-sectional view of a corporate RF feed and transformer arrangement taken in the direction of a line 3—3 in FIG. 2.
FIG. 4 is a cross-sectional view of an individual coaxial line segment utilized to achieve the arrangement as shown in FIG. 3.
Figure 5:
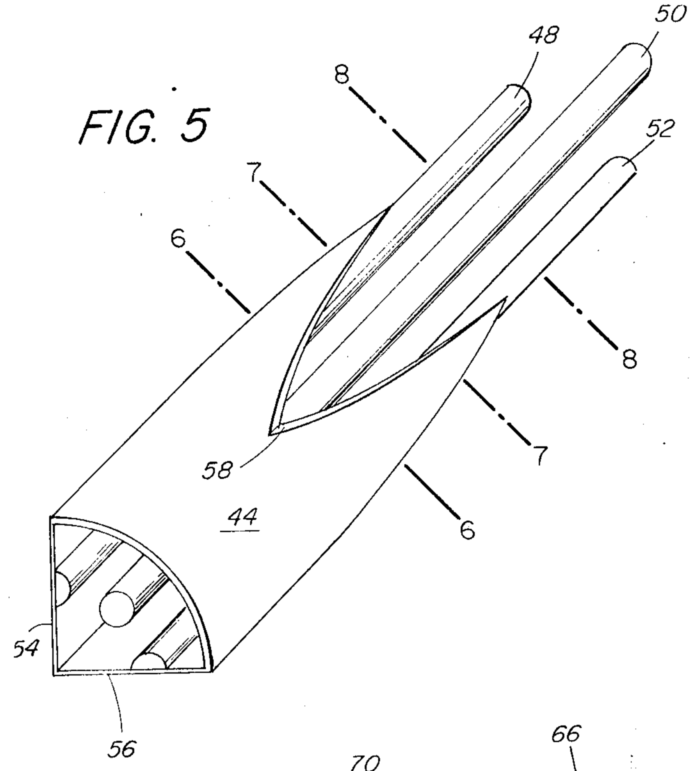
FIG. 5 is an isometric view of a balun transformer for transition from a single coaxial line to parallel wire transmission lines.
Figure 6:
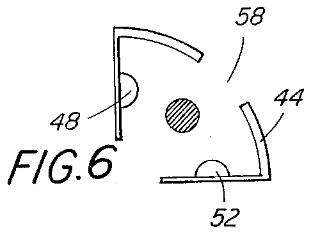
FIGS. 6, 7 and 8 are cross-sectional views taken along the lines 6—6, 7—7 and 8—8 in FIG. 5.
Figure 7:
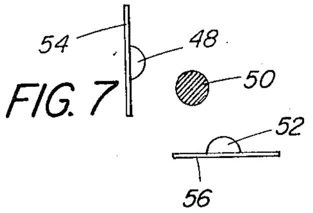
Figure 8:
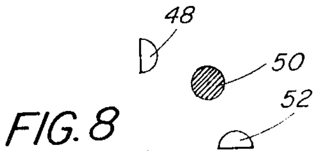

Referring now to FIG. 1 a two-port transmission type composite wave amplifier 32 is illustrated. An input coaxial transmission line 34 comprises a center conductor 36 and an outer conductor 38. In accordance with the teachings of the invention, numerous RF transmission lines are arranged in parallel with the negative resistance devices disposed therebetween. In order to alter the propagation of the RF energy from the coaxial line to the parallel wire transmission lines, it is necessary to provide transition and transformation means. In the present embodiment, a balun transformer 40 is provided. Pie-shaped segments 42 having a tapered outer wall 44 are combined in a cylindrical arrangement supported by shell member 46.

Referring now to FIGS. 3–8 the details of balun transformer 40 arrangement is illustrated. Each pie-shaped segment 42 houses parallel transmission lines 48, 50 and 52. The tapered and notched outer wall 44 is joined by right-angular walls 54 and 56. Transmission lines 48 and 52 are halved and joined, respectively, to planar walls 54 and 56. In this manner when two pie-shaped segments 42 are joined together as shown in FIG. 3, each half of the transmission lines 48 and 52 collectively define a complete circular line. Planar walls 54 and 56 essentially define partition members bounding each of the pie-shaped segments. The lines 50 of the pie-shaped segments form plural center conductors for direct connection to the coaxial line center conductor. As shown in FIG. 3, four pie-shaped segments 42 when joined together form a transition from a single coaxial line 34 to eight parallel wire RF transmission lines. The tapered and notched walls 44 form the outer conductor of the coaxial line. In the succession of views shown in FIGS. 6–8 the orientation of the notched section 58 will be noted along the axis of each pie-shaped segment.

In the overall amplifier, the four lines 50 are suitably joined by an L-shaped section 60 to the center conductor 36 of the coaxial transmission line 34. The transition region to the parallel lines from the coaxial inner conductor is also disposed at the output end of the device in FIG. 1 as well as the common input and output coaxial line in FIG. 2. To assist in the unidirectional flow of the RF power along the parallel wire transmission lines, suitable matching impedance transformers 62 are incorporated in each line after the transition is completed from the coaxial line. The alternately disposed parallel transmission lines formed by the halves and collectively defining parallel lines 48 and 52 will be at ground potential. Lines 50 are above ground potential. The output coaxial line 64 has a center and an outer conductor arrangement similar to the input end for distribution of the total amplified energy.

Figure 9:
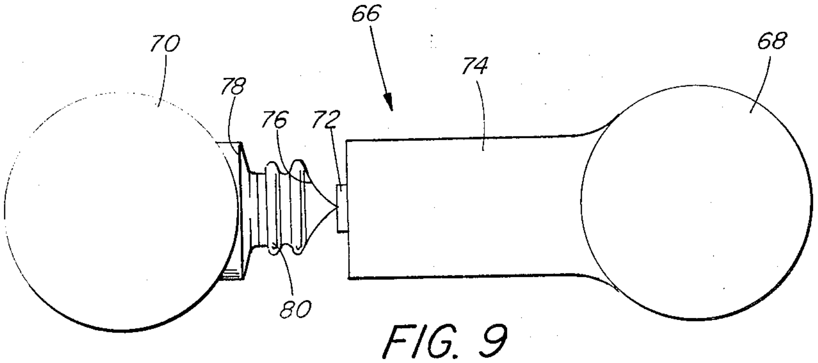
FIG. 9 is a side elevation view of a directly mounted negative resistance device disposed between parallel RF transmission lines.
Figure 10:
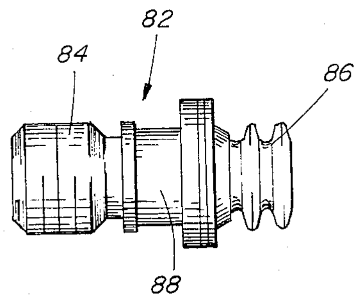
FIG. 10 is an elevation view of a packaged negative resistance device.
Figure 11:
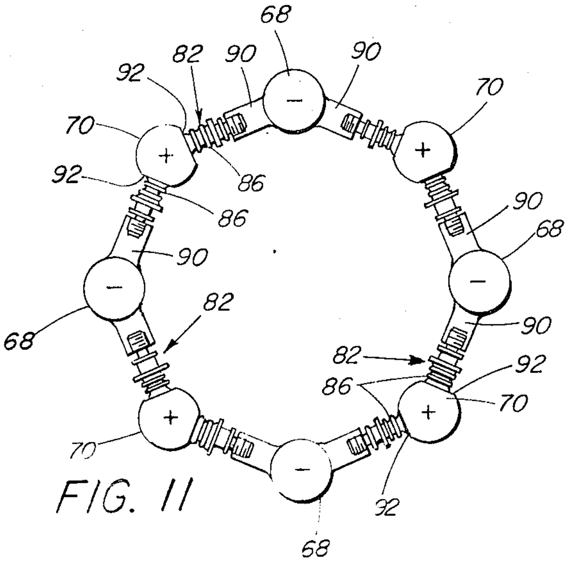
FIG. 11 is an elevation view of a number of packaged negative resistance devices mounted between parallel RF transmission lines.
Figure 12:
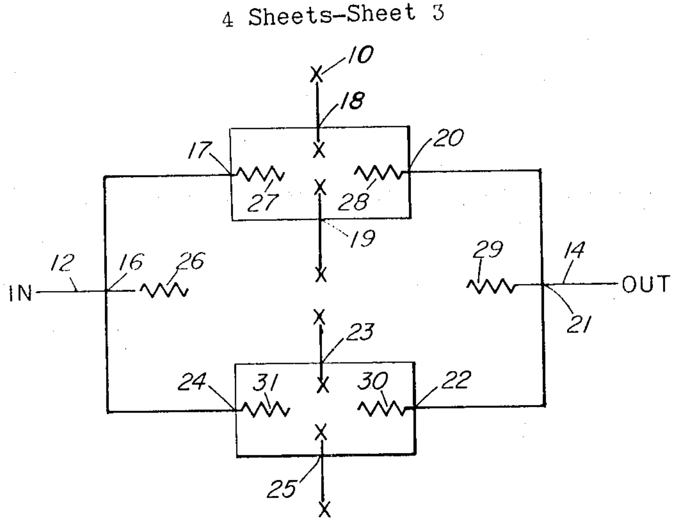
FIG. 12 is a schematic diagram of a prior art hybrid combining circuit.

Referring now to FIGS. 9–11, the negative resistance devices for mounting across the parallel wire transmission lines 48, 50 and 52 are shown. The alternate grounded and above ground transmission lines have been designated by the − and + signs, respectively, for operation of the negative resistances in the desired mode. In operation of the composite wave amplifier the currents flowing in the forward direction add to the forward current generated by the RF drive signal from the coaxial line. The currents flowing in the reverse direction set up a backward wave which is canceled by means of changing the line impedances. The unidirectional transformers 62 provide for the propagation of the combined outputs of the negative resistance devices. Circulators can also be employed to attenuate reverse directed power flow. In FIG. 9 a directly mounted negative resistance device 66 is disposed between line 70 and line 68 which can be at ground potential. The semiconductor element 72 of the junction diode configuration is supported by a series inductor post 74 while the contacting electrode 76 is supported by a bellows arrangement 80 extending from post 78 to assure good electrical contact with the semiconductor element 72.

In FIG. 10, a packaged negative resistance device 82 is shown having a threaded support member 84 and a bellows arrangement 86 at opposing ends of an enclosed junction diode 88. In FIG. 11, a method of mounting a large number of such negative resistance devices with series inductances 90 is shown in an eight wire transmission line arrangement between the above ground conductors 70 and the remaining parallel wire lines 68. It will be noted that parallel wire lines 70 are provided with planar surfaces 92 with the bellows of 86 the packaged diode negative resistance devices 82 contacting these surfaces. The DC bias for the composite wave amplifier is provided through an RF to DC isolator 94 as shown in FIG. 1 which connects to the above ground conductors through center conductor 36. In FIG. 1 the above ground conductors are shown actually as members 50 while such conductors are diagrammatically designated by numeral 70 in FIGS. 9–10. The isolators 94 through which the DC bias line 96 extends is supported by a coaxial conductor 98. With no RF input to the negative resistance devices 86 across the transmission lines, there will be no RF output from these devices.

Devices 82 appear as negative resistors across the wire transmission lines at the operating frequencies because the reactive component of the impedance of these devices is canceled by the series inductance of the device mounts 74 in FIG. 9 and 90 in FIG. 11. The RF wave fed in TEM coaxial mode is converted into a composite wave which propagates down the parallel wire lines. Since the currents now flow equally in forward and reverse directions, the drive signal will be amplified by the addition of all the forward directed currents while the backward wave currents are canceled by the matching transformer structures 62.

Figure 13:
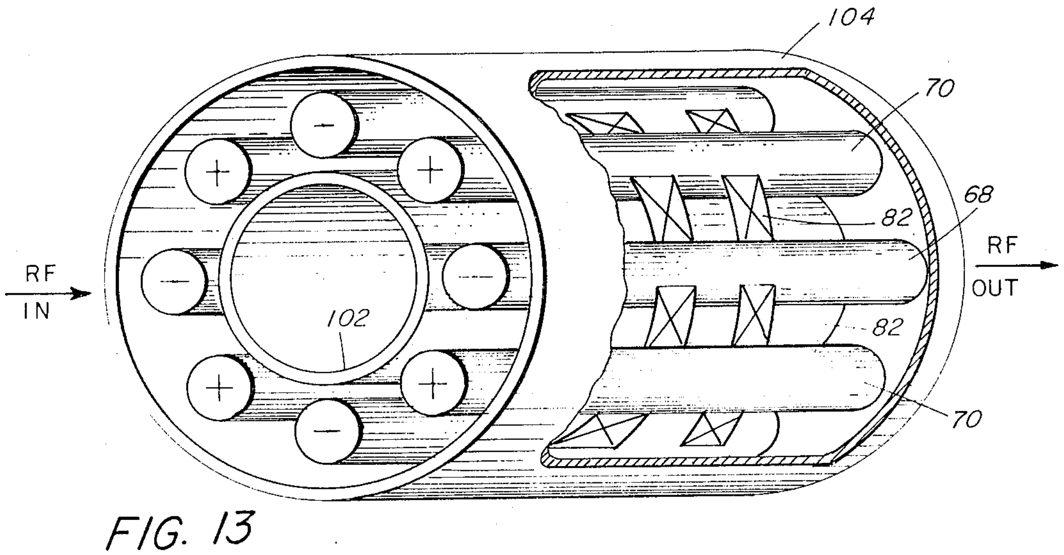
FIG. 13 is a diagrammatic representation of the illustrative embodiment of the invention.
Figure 14:
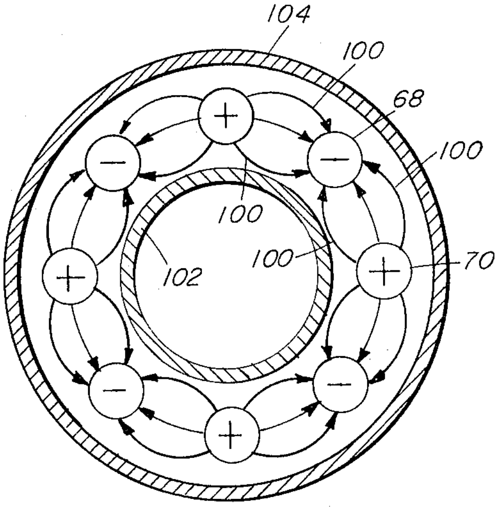
FIG. 14 is another diagrammatic representation of the illustrative embodiment of the invention showing the composite wave configuration.
Figure 15:
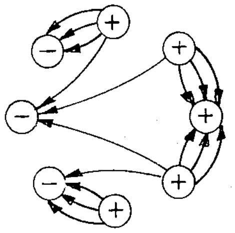
FIGS. 15–22, inclusive, are diagrammatic representations of the various mode patterns possible with an eight conductor amplifier.
Figure 16:
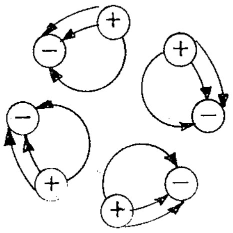
Figure 17:
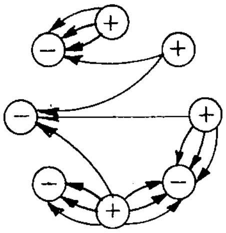
Figure 18:
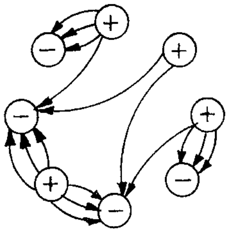
Figure 19:
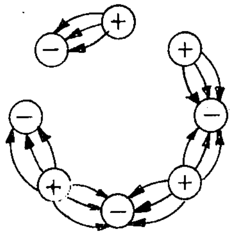
Figure 20:
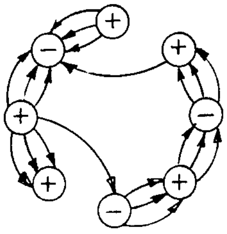
Figure 21:
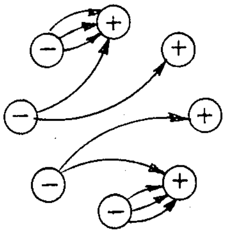
Figure 22:
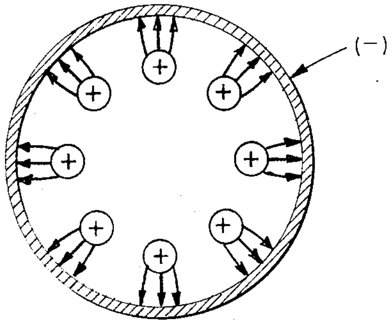

In view of the desirability of having the composite wave amplifier operate in a single propagating mode, further structure will now be described to achieve this purpose. Referring to the diagrammatic representation of the overall structure in FIGS. 13 and 14 parallel transmission lines 68 and 70 are shown with a plurality of negative resistance devices 82 disposed therebetween. As the composite wave travels down the transmission lines, the ± mode is allowed to radiate with the electric field distribution lines 100, as shown in FIG. 14. To attenuate the out-of-phase energy which radiates from the transmission lines and permit the in-phase energy to propagate cylindrical inner and outer resistive loading by means of resistors 102 and 104 are disposed to encircle the parallel wire transmission lines. These resistors comprise a cylinder of any suitable resistive material such as a lossy ceramic coaxially disposed with respect to the parallel wire transmission lines. The resistors 102 and 104 are also shown in the two-port embodiment of FIG. 1. This resistor arrangement besides providing for the phase filtering may be utilized for selective loading to assure the propagating of the RF energy in the desired single composite wave mode which resembles the pi-mode in magnetrons.

FIGS. 15–22 illustrate the other propagating modes possible with the eight wire transmission line arrangement in the present embodiment. It will be noted, particularly in the mode patterns shown in FIGS. 15, 17, 18, 20 and 21, that a crossover of energy in the inner region results which will be effectively prevented by means of the inner resistor 102. Further, in the configuration shown in FIG. 22, the electric fields directed to the outer region will be efficiently attenuated by the outer cylindrical resistor 104.

Referring now to FIG. 2, an alternative embodiment, namely a one-port reflection type amplifier 106 will be described. In this embodiment similar structure to that previously described has been similarly numbered. The device shown in FIG. 1 has essentially been cut in half with a circular shorting plate member 108 mounted perpendicular to the transmission lines 48, 50 and 52. The common input and output RF energy coaxial line 110 comprises a center conductor 112 and an outer conductor 114. The L-shaped sections 60 for the above ground transmission lines are joined to the center conductor 112. These lines pass through the shorting plate member 108 by means of holes 116. Since this is a reflection type amplifier, only one balun transformer 40 is required having the same configuration as that shown in FIGS. 1, 3 and 4. The grounded transmission lines 48 and 52 in this embodiment are connected directly to the shorting plate member 108. The DC bias is applied directly to the above ground transmission lines 50 which are interconnected by members 118. The dimensions of the holes 116 in plate member 108 are selected to provide a sufficiently large cpaacitance to isolate the RF from the DC energy. Alternatively, the bias can be applied directly to the input-output center coaxial line 112 in the manner shown in FIG. 1. Negative resistance devices 82 of the same type described with respect to the two-port embodiment span the parallel wire transmission lines in the same ± mode orientation. Outer cylindrical resistor 104 encircles the parallel transmission lines and inner resistor is also disposed for combined phase focusing as well as selective filtering of the RF energy.

The disclosed composite wave amplifier with the plurality of negative resistance devices joined between the parallel wire transmission lines may be further combined in either parallel or cascade module microwave circuits to achieve even higher power outputs. Each composite wave amplifier together with a suitable directional coupler provides a module which may be efficiently combined to yield CW outputs having high power levels.

There is thus disclosed a solid state composite wave amplifier having a corporate fed linear RF structure with many transmission lines arranged in a parallel array. The linear RF structure provides a cutoff in a circumferential direction and propagates a TEM coaxial mode composite wave in an axial direction. Large numbers of negative resistance devices such as IMPATT diodes operate at equal RF voltages, power and impedances. Resistive loading around the inside and outside of the parallel wire transmission line structure provides for the absorption of the out-of-phase radiated energy while the in-phase components are combined in the output of the device. A single propagating mode is thereby provided which may be illustratively of the ± configuration for maximum efficiency. All undesired modes are damped by the cylindrical resistive loading. The device does not rely on the use of any resonant structures similar to those employed in numerous prior art combining arrangements involving the use of individual cavity resonators which provide a device limited by frequency sensitivity. The present invention is, therefore, inherently broadbanded in view of the parallel wire transmission line arrangement with a suitable RF drive to yield a combined output which is a total of the individual gains of all of the devices mounted within the device. The single mode of operation results in a highly stable structure. Further, the removal of the heat generated by the amplification of energy is rapidly removed by the arrangement and spacing between the RF transmission lines.

Numerous other negative resistance devices may be utilized in the disclosed embodiments. Numerous transition and transformation means may also be employed in the conversion from TEM coaxial line to parallel wire lines. It is intended, therefore, that the foregoing illustrative embodiments and detailed description be considered in its broadest aspects and not in a limiting sense.

We claim:

1. A composite wave nonresonant electromagnetic energy amplifier device comprising:

coaxial waveguide input and output energy coupling means having center conductors;

a circular array of spaced electrically isolated wire transmission lines disposed between said input and output coupling means in a direction parallel to the longitudinal axis of said coaxial waveguides;

transition and impedance matching means electrically interconnecting said center conductors to each transmission line;

a plurality of DC biased negative resistance semiconductor devices electrically coupled between said lines in a direction transverse to the longitudinal waveguide axis;

coaxial resistive loading means disposed inside and outside of said lines to attenuate radiated out-of-phase energy propagating in said lines to provide a single coaxial TEM propagation mode for the combined amplified energy in said output means.

2. The device according to claim 1 wherein said transition and transformation means comprise a balun transformer.

3. The device according to claim 2 wherein said balun transformer comprises a plurality of pie-shaped segments joined together in a cylindrical configuration.

4. The device according to claim 3 wherein each segment defines at least one wall member supporting substantially a one-half section of said parallel wire transmission line.

5. The device according to claim 1 wherein said negative resistance devices incorporate a bellows arrangement to contact a predetermined alternate parallel wire transmission lines.

6. A compositive wave reflection type electromagnetic energy amplifier device comprising:

a common coaxial waveguide input and output energy coupling means having a center conductor;

a circular array of spaced electrically isolated wire transmission lines extending parallel to the longitudinal axis of said waveguide;

transition and impedance matching means electrically interconnecting said center conductor to each transmission line;

a plurality of DC biased negative resistance semiconductor devices disposed between said lines in a direction transverse to the longitudinal waveguide axis;

coaxial resistive loading means disposed inside and outside of said lines to attenuate radiated out-of-phase energy propagating in said lines to provide a single coaxial TEM propagation mode for the combined amplified energy in said output means; and a circular conductive shorting plate member joined to alternate parallel wire transmission lines.

* * * * *